United States Patent [19]

Forster et al.

[11] 3,757,606
[45] Sept. 11, 1973

[54] APPARATUS FOR THE AUTOMATIC SHIFTING OF CHANGE-SPEED TRANSMISSIONS, ESPECIALLY OF MOTOR VEHICLES

[75] Inventors: Hans-Joachim M. Forster, Stuttgart-Riedenberg; Ulrich Eltze, Esslingen-Liebersbronn, both of Germany

[73] Assignee: Daimler-Benz Aktiengesellschaft, Stuttgart-Unterturkheim, Germany

[22] Filed: Sept. 29, 1970

[21] Appl. No.: 76,463

[30] Foreign Application Priority Data
Sept. 29, 1969 Germany.................. P 19 49 084.7

[52] U.S. Cl................... 74/733, 74/645, 74/DIG. 3
[51] Int. Cl........................ F16h 45/02, F16h 47/08
[58] Field of Search..................... 74/732, 733, 645; 192/3.25, 3.26, 3.27, 3.29, 3.3, 3.52, 363

[56] References Cited
UNITED STATES PATENTS
3,053,116  9/1962  Christenson et al............. 74/645 X
3,505,907  4/1970  Fox et al........................... 74/732 X Primary Examiner—Manuel A. Antonakas
Assistant Examiner—Thomas C. Perry
Attorney—Craig, Antonelli, Stewart & Hill

[57] ABSTRACT

A method and apparatus for automatically shifting the individual speeds of a change-speed gear, particularly for motor vehicles, by means of force-locking shifting elements and by the use of a hydrodynamic unit, such as a torque converter or hydrodynamic coupling, whose slippage condition is increased during the change in transmission ratio by engageable means, in which the pressure space of the shifting element for the new speed is filled with a pressure medium while the shifting element for the pre-existing speed remains under hydraulic shifting pressure and the slippage condition in the hydrodynamic unit is maintained for a certain length of time; only after the filling of the pressure space of the shifting element for the new speed and with substantial simultaneous disengagement of the pre-existing speed, the slippage condition in the hydrodynamic unit is then increased; in the event a by-pass clutch is provided for the hydrodynamic unit, the by-pass clutch remains engaged until the pressure space of the servo-shifting element for the new speed is completely filled, at which time the by-pass clutch is disengaged with simultaneous disengagement of the pre-existing speed.

39 Claims, 6 Drawing Figures

APPARATUS FOR THE AUTOMATIC SHIFTING OF CHANGE-SPEED TRANSMISSIONS, ESPECIALLY OF MOTOR VEHICLES

The present invention relates to a method for the automatic hydraulic shifting of change-speed transmissions with fixed transmission ratios, especially of motor vehicles, by means of force-locking shifting elements for the transmission speeds by the use of a hydrodynamic unit (hydrodynamic torque converter or hydrodynamic coupling), whose slippage condition is increased by shiftable engagements during a speed change.

With known automatic transmissions a slippage in the servo-shifting element (for example, in a brake or in a clutch in planetary gears) of the newly engaged speed takes place during the shifting operation, whereby the engagement or abutment force of the servo-shifting element is so selected that the shifting operation proceeds sufficiently smoothly while simultaneously, however, the friction work does not exceed a permissive extent. Especially with large speed jumps (large jumps in the transmission ratios) and with large rotating masses on the driving side these two requirements frequent'y are compatible only with difficulties. For example, it can be achieved by the arrangement of a by-pass clutch connected in parallel to the torque converter that the necessary shifting work is produced partially by the hydrodynamic unit and partially by the by-pass clutch in that at first the hydrodynamic unit receives the differential rotational speed between pump wheel and turbine wheel conditioned by the new speed or transmission ratio and the synchronization of the shifting elements to be brought into engagement is realized in the first part of the shifting operation.

It is known in the prior art to provide a by-pass clutch connected in parallel with the hydrodynamic unit, which during the initiation of the shifting operation, i.e., during the beginning of the filling of the pressure space of the servo-shifting element for the new speed, is disengaged and is re-engaged after the termination of the shifting operation in the change-speed gear, for example, in dependence on the rotational speed of the turbine wheel. This shifting work with respect to the engine is produced in this case partially by the shifting member of the change-speed gear and partially by the by-pass clutch. This heretofore customary shifting practice, in which the by-pass clutch is disengaged simultaneously with the beginning of the filling of the pressure space of the servo-shifting element for the new speed, however, has as a consequence that the engine is at first unloaded and speeds up to the rotational speed limit. Simultaneously therewith the driving torque collapses.

It is the aim of the present invention above all to eliminate this disadvantage of the heretofore customary shifting methods and shifting installations. It is proposed for that purpose in accordance with the present invention that with a shifting element for the pre-existing speed still remaining under hydraulic shifting pressure, the pressure space of the shifting element for the new speed is filled with pressure medium and the slight slippage condition is maintained in the torque converter or in the coupling for such length of time, and in that only after the filling of the pressure space of the shifting element for the new speed the slippage condition is increased simultaneously with the disengagement of the pre-existing speed.

In the case that a by-pass clutch is provided for the torque converter or for the hydrodynamic coupling, the present invention essentially consists in that with the servo-shifting element for the pre-existing speed still remaining under hydraulic shifting pressure, the pressure space of the servo-shifting element for the new speed is filled with pressure medium (especially pressure oil) and simultaneously therewith the by-pass clutch remains engaged and the latter is disengaged only after the filling of the pressure space of the servo-shifting element for the new speed and with the disengagement of the pre-existing speed. It is achieved thereby that the servo-shifting element of the new speed slipping under load determines the torque reaching the drive so that no interruption or practically no interruption in tractional force occurs. Simultaneously therewith, the turbine wheel of the hydrodynamic unit is decelerated so rapidly that the torque input of the hydrodynamic unit increases rapidly and the engine speeds up only insignificantly.

Preferably with the beginning influence of the shifting system on the servo-shifting element of the new speed, i.e., especially with the beginning filling of the pressure space thereof, the direct supply of the shifting element of the by-pass clutch with working pressure is replaced by an indirect feed by way of a part of the pressure system, which also supplies the servo-shifting element of the pre-existing speed, whereby with the full engagement of the new speed this part of the pressure system is disconnected from the feed with the working pressure. For shifting from the direct to the indirect feed of the by-pass clutch, a pressure differential produced in the line system for the automatic shifting system between the medium source at working pressure and the line system acting on the servo-shifting element of the transmission speeds may be utilized in that, for example, the pressure difference is utilized for the purpose to adjust a shifting slide valve or a corresponding shifting or control element for the by-pass clutch. Simultaneously therewtih the medium which is under a lower pressure, may be fed to the by-pass clutch.

Preferably the method according to the present invention is applied in conjunction with a conventional receiver which is effective in particular in such a manner that during the filling phase the servo-shifting element of the new speed is supplied from the receiver by the displacement effect of the receiver piston, and in that after completed filling of the servo-shifting element of the new speed—with returning receiver piston—the working pressure acting on this shifting element in cooperation with a control slide valve of the receiver unit is controlled and regulated for such length of time until the rotational speeds of the elements of transmission to be brought into engagement with one another are synchronized and a soft, shockless shifting is made possible thereby.

Preferably the by-pass clutch is retained under a residual pressure during the disengagement period of the by-pass clutch, especially during the regulating phase of the shifting pressure, which residual pressure lies somewhat above the hydraulic pressure prevailing on the inside of the torque converter and also on the back side of the shifting element, as a rule a piston, of the by-pass clutch. For example, an excess pressure valve serves for that purpose which is loaded on its backside by the pressure on the inside of the torque converter, preferably with the assist of an additional spring, and which thus continues to keep under pressure the line leading to the by-pass clutch or prevents a discharge of the pressure medium present in the pressure space of the by-pass clutch if that part of the line system, to which the servo-shifting element of the pre-existing speed as well as also the line leading to the by-pass clutch are connected, becomes pressureless by disconnection from the working pressure of the system. It is achieved by this residual pressure that the shifting element of the by-pass clutch remains applied so that in case of re-engagement of the by-pass clutch, the latter can also be engaged directly following the shifting of the transmission speeds, i.e., without interruption by necessary filling of the pressure space of the clutch, and the engagement of the speeds as well as the closing or engagement of the by-pass clutch appears as a uniform transition.

The present invention relates additionally to a particularly appropriate installation effecting the shifting in a sequentially correct and reliable manner. It should be noted at this point that, if slide valves, pistons or the like are mentioned in connection with the present invention, these expressions and terms also include such elements or devices which are equivalent thereto and are suitable for the fulfillment of the posed problem. The shifting operation may be fully automatic or for example, may be provided semi-automatic insofar as the initiation of the shifting of the speeds takes place at will, for example, by a shifting lever.

Accordingly, it is an object of the present invention to provide a method and installation for automatically shifting change-speed transmissions, especially of motor vehicles, which avoid by simple means the aforementioned shortcomings and drawbacks encountered in the prior art.

Another object of the present invention resides in a method and apparatus for atuomatically shifting change-speed gears with discrete speeds, which assure a smooth, shock-free shifting operation substantially without any practical interruption in the driving torque.

A further object of the present invention resides in a method and apparatus for automatically shifting change-speed gears of motor vehicles which avoid the danger of a speeding-up of the engine during the shifting operation while at the same time assuring an accurate and reliable engagement of the various speeds.

These and further objects, features and advantages of the present invention will become more obvious from the following description when taken in connection with the accompanying drawing which shows, for purposes of illustration only, one embodiment in accordance with the present invention, and wherein FIG. 1 is a simplified schematic view for an automatic shifting installation according to the present invention in which the parts which are not necessary for an understanding of the present invention are omitted, and more particularly showing the various parts of the transmission in the normal rest condition;

Figure 1:
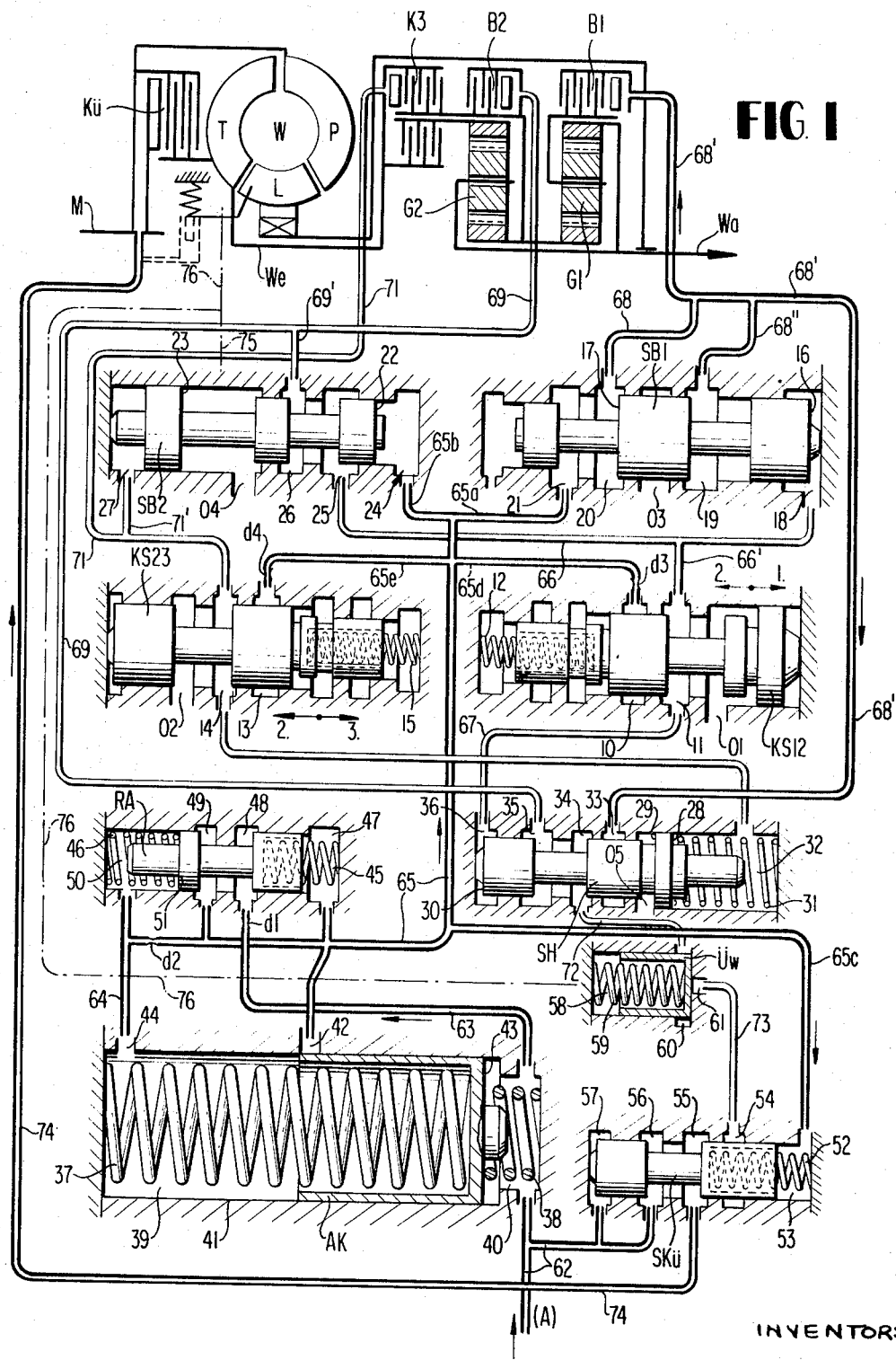
Figure 2:
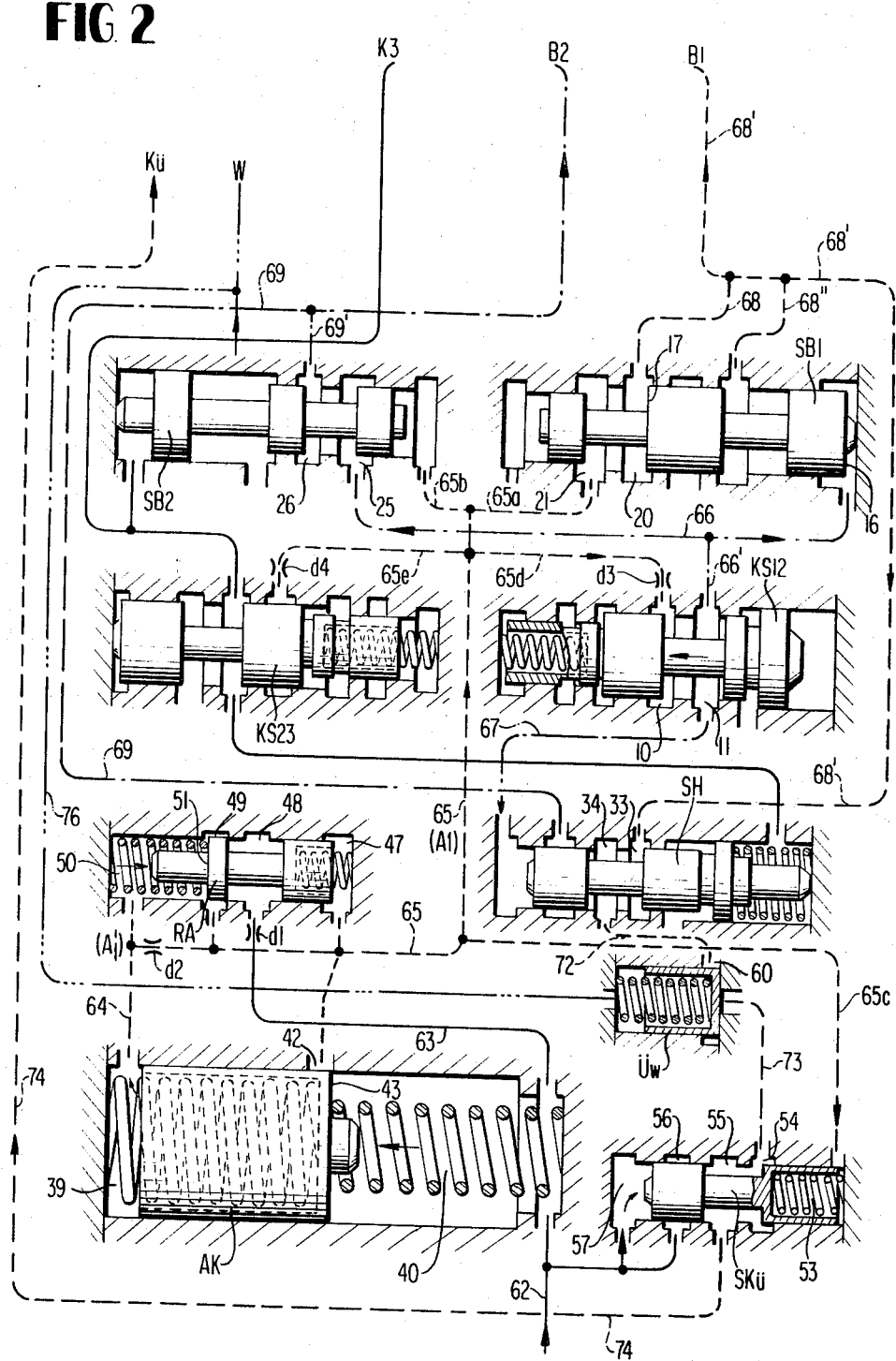
FIG. 2 is a partial schematic view of the same shifting system in a first intermediate condition during the shifting operation.
Figure 3:
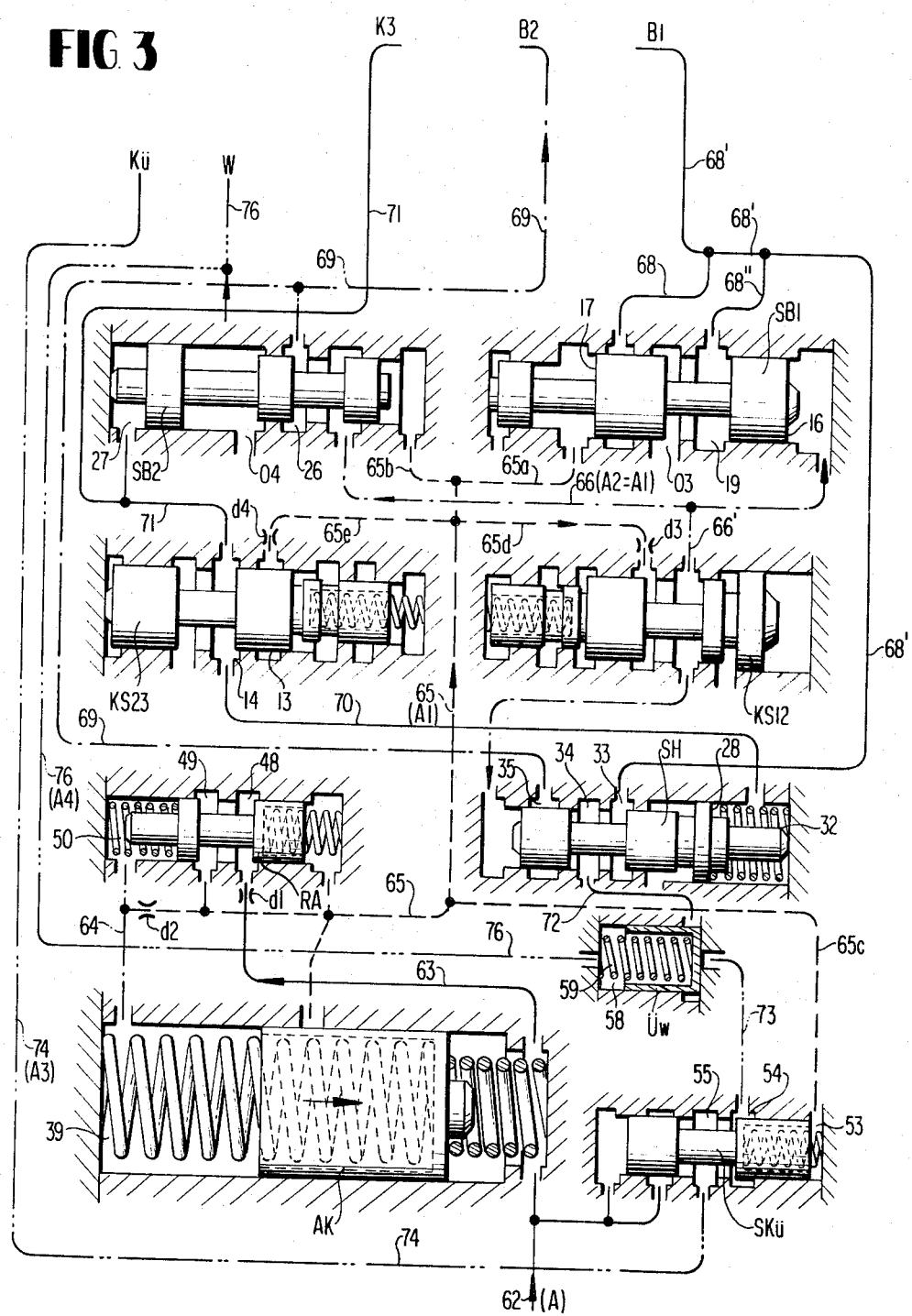
FIG. 3 is a partial schematic view of the same shifting system in a further intermediate condition during the shifting operation.

Referring now to the drawing wherein like reference numerals are used throughout the various views to designate like parts, a schematic shifting diagram of the present invention is illustrated in FIGS. 1-3 of the drawing. Referring now to FIG. 1, the engine shaft M drives by way of a torque converter W having the pump wheel P, the turbine wheel T and a guide wheel L (which in case of a hydrodynamic coupling would be omitted), of a transmission input shaft We and, for example, of two series-connected planetary gears $G_1$ and $G_2$, a transmission output shaft Wa which serves, for example, for the drive of the wheels of a motor vehicle. The planetary gears $G_1$ and $G_2$ may be constructed in any suitable known manner, and the transmission may have any desired number of transmission steps or ratios, for example, may serve for the engagement of three or four transmission steps or ratios. For the purpose of shifting, conventional clutches, brakes or the like may be provided as servo-shifting elements. In the illustrated embodiment, for example, two brakes $B_1$ and $B_2$ for the engagement of a first and a second speed as well as a clutch $K_3$ for a third speed are schematically indicated. Furthermore, a by-pass clutch $K_u$ is arranged between the engine shaft W and the turbine wheel T or the transmission input shaft We for the purpose of by-passing the torque converter W. The brakes $B_1$ and $B_2$, the clutch $K_3$ and the by-pass clutch $K_u$ are actuated hydraulically by pistons as shifting elements.

In the schematic shifting diagram of the hydraulic automatic shifting installation, which illustrates only those shifting elements necessary for the understanding of the present invention, the following reference numerals designate the following parts:

KS 12 a command slide valve for the initiation of the shifting operation between the first and the second speed, KS 23 a command slide valve for the initiation of the shifting operation between the second and the third speed, SB 1 a shifting slide valve for the first speed, SB 2 a shifting slide valve for the second speed, SH a shifting slide valve for shifting-up, AK a receiver piston, RA a control slide valve for the receiver piston, SKu a shifting slide valve for the by-pass clutch Ku and Uw an excess pressure valve dependent on the pressure in the torque converter W.

In particular, these shifting elements, insofar as of interest herein, have the following features.

The command slide valve KS 12 is supported as differential piston slide valve member in a slide valve cylinder with the control grooves 10 and 11 as well as with a discharge 01 leading to a supply tank or the like for the shifting medium and is forced toward the right as viewed in the drawings by a spring 12. In a similar manner, the slide valve cylinder of the command slide valve KS 23 is provided with control grooves 13 and 14 as well as with a discharge 02. A spring 15 forces the command slide valve piston toward the left as viewed in the drawing.

The shifting slide valve SB 1 is also constructed as differential piston slide valve with a large effective piston surface 16 and a smaller effective annular piston surface 17. Control grooves 18, 19, 20, 21, and a discharge 03 are provided in the slide valve cylinder thereof. In a similar manner, the shifting slide valve SB 2 includes a surface 22 and an annular surface 23 whereas the slide valve cylinder thereof is provided with control grooves or spaces 24, 25, 26, 27 and with a discharge 04.

Also the shifting-up slide valve SH is constructed as differential slide valve with a large end surface 28, an annular surface 29 and a smaller end surface 30, is acted upon by a spring 31 and is slidingly supported with a slide valve cylinder provided wiht the control grooves or spaces 32, 33, 34, 35, 36 and with a discharge 05.

The receiver piston AK is acted upon by a stronger spring 37 and by a weaker spring 38 from opposite sides, whereby the spring 37 is accommodated in a piston space 39 and the spring 38 in a piston space 40 of a cylinder 41. A control groove 42 is valved by the piston edge 43 when the receiver piston AK moves into its left end position. Additionally, a control groove 44 is provided at the left end of the cylinder 41.

The control slide valve RA of the receiver piston AK is retained by oppositely acting springs 45 and 46 in a center position within the slide valve cylinder provided with control grooves or spaces 47, 48, 49 and 50 whereby the control groove 49 is valved by the control edge 51.

Furthermore, the cylinder of the shifting slide valve SKu acted upon by a spring 52 for the by-pass clutch Ku is provided with control spaces or grooves 53, 54, 55, 56, and 57 whereas the excess pressure valve Uw is acted upon, on the one hand, on its one piston side 58 by the torque converter pressure and additionally by a spring 59, and, on the other, by way of a control groove 60 and a central bore 61 by a control pressure between the shifting-up slide valve SH and the shifting slide valve SKu for the by-pass clutch.

The working pressure (A) effecting the shifting operation is supplied by way of a line 62 which leads to the piston space 40 and by way of a line section 63 to a throttle $d_1$ upstream of the control groove 48 of the control slide valve RA. A line 64 leads from the control space 50 of the latter to the control groove 44 in the receiver cylinder 41 and is connected by way of a throttle $d_2$ with a line 65 which in its turn is in communication with the control grooves or spaces 49, 47 and 42 (by way of branch lines), with the control grooves or spaces 21, 24 and 53 (by way of branch lines 65a, 65b, and 65c) as well as (by way of branch lines 65d and 65e and throttles $d_3$ and $d_4$) with control grooves or spaces 10 and 13 of the various slide valves, respectively. Line 66 connects control groove 18 of shifting slide valve SB 1 with control groove 25 of shifting slide valve SB 2 as well as with control groove 11 of command slide valve KS 12 by way of branch line 66', while line 67 connects control groove 11 of command slide valve KS 12 with the control groove 36 of shifting-up slide valve SH. Interconnected lines 68, 68' and 68'' connect together the control grooves 19 and 20 of the shifting slide valve SB 1 as well as control groove 33 of the shifting-up slide valve SH and the pressure space of the brake $B_1$; line 69 including branch line 69' connect the pressure space of the brake $B_2$ with the control groove 26 of shifting slide valve SB 2 and control groove 35 of the shifting-up slide valve SH. Line 70 connects control groove 14 of the command slide valve KS 23 with the pressure space 32 of the shifting-up slide valve SH while line 71 connects the same control groove 14 with the pressure space of clutch $K_3$ as well as by way of branch line 71' with the pressure space 27 of the shifting slide valve SB 2. Furthermore, lines 72 and 73 connect the control groove 34 of the shifting-up slide valve SH by way of the excess pressure valve Uw (control groove 60) with the control groove 54 of the shifting slide valve SKu of the by-pass clutch Ku. Additionally, a line 74 connects the control groove 55 in the shifting slide valve SKu with the pressure space of the by-pass clutch Ku, and a connecting line 76 supplied with pressure fluid from a feed line 75 connects the interior of the torque converter W with a space 58 on the back side of the excess pressure valve Uw.

In FIG. 1, the shifting system is illustrated in first speed. The lines under working pressure (A) are illustrated in heavy full lines. The command slide valve KS 12 is in its right end position under the effect of the spring 12, while the command slide valve KS 23 is in its left end position under the effect of the spring 15. The shifting slide valve SB 1 is under working pressure at its surface 17 by way of the line 63, throttle $d_1$, control grooves 48 and 49 of the control valve RA, line 65 and branch line 65a so that it assumes its right end position whereas the shifting slide valve SB 2 is in its left end position with the surface 22 thereof under working pressure by way of the branch line 65b. The brake $B_1$ is therefore engaged by way of line 68, 68' connected with the branch line 65a by way of control grooves 21 and 20 of the slide valve SB 1. Similarly, the by-pass clutch Ku is engaged which is also under the working pressure A by way of line 74 and control grooves 55 and 56 of the shifting slide valve SKu disposed in its left end position, thus feeding the working pressure (A) present in line 62 to the by-pass clutch Ku.

The lines or conduits indicated in the weak full lines are each pressureless. Thus, the pressure space of the brake $B_2$ is connected with the discharge 01 in the command slide valve KS 12 by way of line 69, 69', control grooves 26 and 25 of shifting slide valve SB 2, line 66, 66' and control groove 11 of command slide valve KS 12; the pressure space of the clutch $K_3$ is in open connection with the discharge 02 of the command slide valve KS 23 by way of line 71 and control groove 14 in the command slide valve KS 23.

By way of the throttle $d_2$ which, however—like the throttle $d_1$—is ineffectual in the static condition of the system, and by way of the line 64, the piston space 39 at the receiver piston AK and the piston space 50 as well as —by way of the connection by the line 65—the piston space 47 of the control slide valve RA are under working pressure A so that the receiver piston AK assumes approximately its right end position while the control piston RA assumes a center position.

The shifting operation from the first into the second speed takes place as follows:

The command slide valve KS 12 is displaced toward the left—either automatically or manually or the like. As a result thereof, as shown in FIG. 2, the line 65 is connected by way of branch line 65d and throttle $d_3$ as well as by way of the control grooves 10 and 11 of the command slide valve KS 12 with the lines 66, 66' and 67 and is thus connected by way of the line 66', 66, the control grooves 25 and 26 of the shifting slide valve SB 2 and the lines 69', 69 with the pressure space of the brake $B_2$, i.e., of the servo-shifting member of the second speed so that pressure space of the brake $B_2$ begins to fill. At the same time the pressure space of the brake $B_1$, i.e., of the servo-shifting element of the first speed, remains connected with the line $65a$, $65$ by way of the lines $68'$, $68$ and the control grooves $20$, $21$ of the shifting slide valve SB 1, the line $65$ being initially still in connection with the line $62$, $63$ under the full working pressure (A) by way of the control grooves $48$, $49$ of the receiver control slide valve RA and the throttle $d_1$. By reason of the throttle $d_1$, the pressure ($A_1$) in the line $65$ and in the lines connected thereto, indicated by the dash lines (---), is smaller than the working pressure (A) supplied by the working pressure source of the shifting system, and by reason of the throttle $d_3$ the pressure ($A_2$) in the lines $66'$, $66$ and the lines connected therewith, indicated in dash and dot lines (-·-) is smaller than the pressure ($A_1$), therefore: $(A) > (A_1) > (A_2)$.

By reason of this pressure ratio the receiver piston AK moves toward the left. The oil displaced out of the piston space $39$ is displaced, on the one hand, by way of the throttle $d_2$ into the line $65$ and, on the other, into the piston space $50$ of the control slide valve RA which as a result thereof is displaced toward the right, whereby the pressure ($A_1'$) in the connecting line $64$ and in the piston spaces $39$ and $50$ of the control slide valve RA, depending on the throttling effect at the throttle $d_2$, is slightly higher than the pressure ($A_1$). As soon as the edge $51$ of the control slide valve RA valves the control groove $49$ and opens up the latter, as indicated in FIG. 2, the throttle $d_2$ is by-passed so that the piston AK is now able to displace the oil out of the piston space $39$ unthrottled into the line $65$. The pressure ($A_1$) is thereby dependent directly on the displacement effect of the piston AK.

In the meantime, the shifting slide valve SKu for the by-pass clutch Ku has been displaced toward the right since $(A) > (A_1)$. As a result thereof the direct connection of the line $74$ leading to the by-pass clutch Ku with the working pressure line $62$ between the control grooves $56$ and $55$ is interrupted and an indirect connection is established by way of the lines $65$, $65a$, control grooves $21$, $20$ of the shifting slide valve SB 1, lines $68$, $68'$, control grooves $33$, $34$ of the shifting-up slide valve SH, line $72$, space $60$ of the excess pressure valve Uw, line $73$ and the control grooves $54$, $55$ at the shifting slide valve SKu leading to the line $74$.

If the piston AK has reached its left end position (FIG. 2 illustrates the shifting system shortly before this end position is reached) and if the control groove $42$ is thereby opened up by the edge $43$ of the piston AK, then the oil can flow over from the piston space $40$ directly into the line $65$. The control slide valve RA returns at the same time again into its center, equilibrium position since no pressure medium flows any longer through the throttle $d_2$.

While the pressure space of the brake $B_2$ for the new speed (pressure $A_2$) fills, the pressure spaces of the brake $B_1$ of the pre-existing speed and of the by-pass clutch Ku continue also to remain under pressure, and more particularly under the reduced pressure ($A_1$) compared to the main working pressure (A) of the shifting system.

If the pressure space of the brake $B_2$ is filled and if therewith the flow in the lines $66$, $69'$, $69$ to the brake $B_2$ stops, then the pressure $(A_2) = (A_1)$ so that the pressure at the surface $16$ of the shifting slide valve SB 1 exceeds that of surface $17$ and as a result thereof the shifting slide valve SB 1 is displaced toward the left into the position according to FIG. 3. The pressure space of the brake $B_1$ is thus connected by way of the control groove $19$ of the shifting slide valve SB 1 with a discharge 03 and the first speed is therewith disengaged.

With the disengagement of the brake $B_1$ also the by-pass clutch Ku is essentially disengaged in that, when the line $68$, $68'$ becomes pressureless, also the line $72$ connected with these lines by way of the control grooves $33$, $34$ at the shifting-up slide valve SH becomes pressureless. However, the excess pressure valve Uw closes under the pressure on the inside of the torque converter W prevailing in line $76$ and in valve space $58$ and under the pressure of the spring $59$ so that the pressure space of the by-pass clutch Ku is closed off against the outside, though the lines $74$, $73$ are connected by way of the control grooves $54$, $55$ of the shifting slide valve SKu, and thus continues to remain initially under a residual pressure ($A_3$), indicated by the dash and double-dotted line (-··-) which is slightly larger than the pressure in the torque converter space ($A_4$) indicated by the dash and triple-dotted line (-···-). Since the residual pressure also acts on the backside of the shifting element (piston) of the by-pass clutch Ku, this shifting element remains applied to the extent determined by the residual pressure so that the by-pass clutch Ku can seize immediately during a subsequent re-engagement, i.e., can be fully re-engaged with a minimum of time.

As soon as the brake $B_2$ for the second speed has seized, i.e., has been engaged, and the brake $B_1$ and the clutch Ku have been disengaged (or the latter practically disengaged), the rotational speed of the torque converter turbine wheel T is reduced by reason of the engagement of the second speed, and more particularly is reduced more strongly, i.e., to a greater extent than the engine rotational speed or the rotational speed of the pump wheel P so that a rotational speed difference between pump wheel P and turbine wheel T occurs in the torque converter, i.e., the slippage increases.

With the filling of the pressure space of the brake $B_2$ and the increase of the pressure ($A_1$), also the pressure in the line $64$ and in the piston space $39$ of the receiver increases and forces the receiver piston AK back toward the right whereby the piston velocity is regulated by the receiver control slide valve RA. The condition of the shifting system at an instant during this control phase of the shifting operation is indicated in FIG. 3.

As soon as the receiver piston AK has returned into its right end position (as viewed in FIG. 3), the pressure $(A_1) = (A)$ so that the condition according to FIG. 1 is re-established with the exception of the change in speed or transmission ratio. The shifting slide valve SKu again returns toward the left and the by-pass clutch Ku is thereby connected again to the working pressure (A), i.e., the by-pass clutch Ku is again engaged, which can take place practically without transition as a result of the prior application of the clutch. The still existing higher rotational speed of the engine and of the pump wheel P is thereby brought down to the lower rotational speed of the turbine wheel T.

The shifting from the second into the third speed takes place in a similar manner. The command slide valve KS 23 is displaced toward the right—either automatically or by hand or the like—, so that the pressure space of the clutch $K_3$ is connected with the lines $65$, $65e$ by way of the throttle $d_4$ and control grooves $13$, $14$ in the command slide valve KS 23 and the line $71$ and thus begins to fill with pressure oil. As a result thereof, the receiver piston AK in cooperation with the regulating slide valve RA responds in the manner described hereinabove and the shifting slide valve SKu for the by-pass clutch Ku shifts in the also-described manner by movement toward the right. However, the shifting-up slide valve SH moves from the position according to FIG. 3 toward the left since the filling pressure at the clutch $K_3$ acts on the large end surface 28 of the shifting piston of slide valve SH in the space 32 thereof by way of the line 70 and the control groove 14 in the command slide valve KS 23. The pressure in the pressure space of the brake $B_2$ can thus continue by way of line 69, control grooves 35, 34 of the shifting-up valve SH, line 72, excess pressure valve Uw, line 73, control grooves 54, 55 of the slide valve SKu and line 74 to the pressure space of the by-pass clutch Ku. The pressure space of clutch $K_3$ thus fills whereas the second speed remains initially still engaged by the brake $B_2$ and the by-pass clutch Ku also remains initially still engaged.

After the build-up of the complete pressure in clutch $K_3$, the shifting slide valve SB 2 moves toward the right by reason of the pressure in the space 27 and connects the pressure space of the brake $B_2$ by way of lines 69, 69' and its control groove 26 with the discharge 04, i.e., thus disengages the second speed. Simultaneously therewith, also the by-pass clutch Ku is disengaged by reason of the connection of line 74 with the line 69 (or brake $B_2$) by way of the control grooves 55, 54 of the shifting slide valve SKu, lines 73, 72, and control grooves 34, 35 of the shifting-up slide valve SH under maintenance of a residual pressure ($A_3$) by means of the excess pressure valve Uw and determined by the pressure on the inside of the torque converter W. After the return of the receiver piston AK into the right end position and the return of the shifting slide valve SKu into the left end position thereof, the by-pass clutch Ku is fully re-engaged.

The shifting operation from one into the other speed will now be explained by reference to FIGS. 4 and 5.

Figure 4:
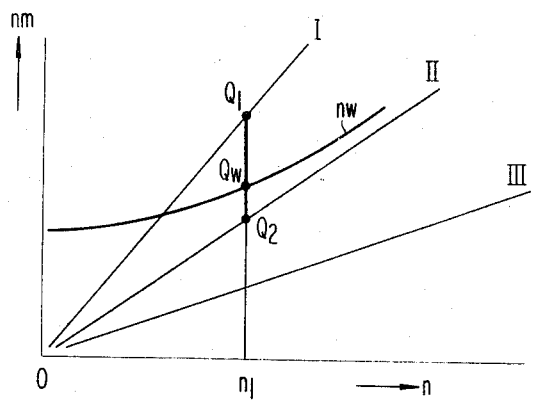
FIG. 4 is a rotational speed diagram for a change-speed transmission having fixed transmission ratios and equipped with a torque converter.

In FIG. 4 the rotational speed of the engine $n_m$ is plotted against the driving rotational speed $n$ in the individual speeds, for example, in the three speeds I, II and III, and more particularly each in the by-pass speed with engaged by by-pass clutch Ku. Additionally, for example, the rotational speed characteristics $n_w$ of the torque converter pump wheel P constantly connected with the engine or of the engine for an engaged second speed with opened by-pass clutch Ku is indicated in this diagram; at $n = 0$, the pump rotational speed has a finite valve and approaches with increasing speeds $n$ asymptotically the curve II in the second speed.

If, for example, the transmission output shaft Wa has a rotational speed $n_1$ and is to be shifted from first to second speed, i.e., from the point $Q_1$ to the point $Q_2$, then this takes place in that at first one shifts to the torque converter, i.e., to a point of the torque converter characteristics $n_w$ (second speed). As a result of the disengagement of the by-pass clutch Ku the engine rotational speed decreases—with the driving rotational speed $n$ remaining the same—initially from the point $Q_1$ to the point $Q_w$ as a result of the speed change in the change-speed gear whereupon after re-engagement of the by-pass clutch Ku, the rotational speed decreases further from the point $Q_w$ to the point $Q_2$. As can be seen therefrom, a large part of the rotational speed difference is absorbed thereby by the torque converter W whereas the remaining rotational speed difference is absorbed by the speed shifting element. The reduction of the shifting work in the speed shifting element by the additional engagement of the torque converter is the larger the higher the rotational speed difference is in the torque converter.

Figure 5A:
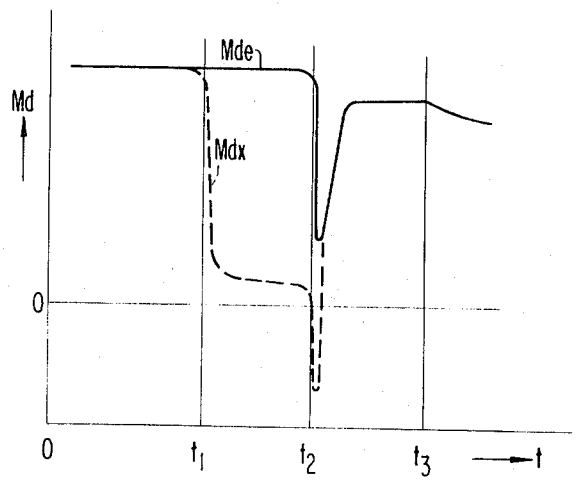
FIG. 5a is a diagram explaining the torque curve and FIG. 5b the pressure curve during a shifting operation.
Figure 5B:
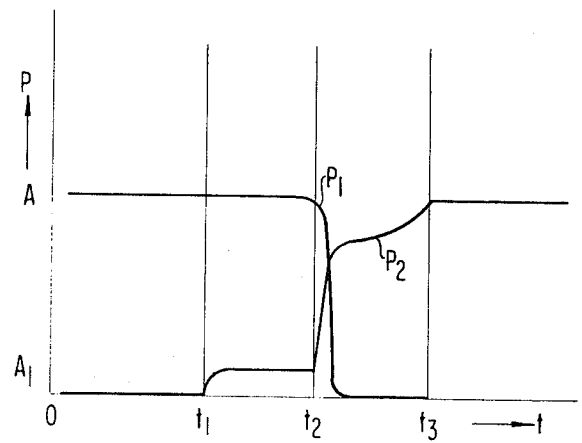

In FIG. 5a, torques Md are plotted against time $t$ whereas in FIG. 5b, pressures $p$ are plotted against the same time $t$ in the schematic diagrams, indicated in these two figures, for example, when shifting from first to second speed.

FIG. 5a illustrates the torque curve $Md_x$ in dash line in connection with the heretofore customary shifting operation with a by-pass clutch disengaged during the shifting operation from one to the next speed, and the torque curve $Md_e$ in full lines for a shifting operation according to the present invention with the by-pass clutch remaining engaged during the shifting operation; furthermore, the shifting pressure $p$ at the servo-shifting elements of the two speeds, with reference to the schematic shifting diagram explained in FIGS. 1 to 3, at the brake $B_1$ for the first speed and at the brake $B_2$ for the second speed, are plotted in this figure. The pressure $p_1$ is thereby the shifting pressure at the brake $B_1$ and the pressure $p_2$ the shifting pressure at the brake $B_2$.

As can be seen from FIG. 5b, the two pressure curves $p_1$ and $p_2$ intersect or cross over one another. At the point $t_1$ the filling of the pressure space of the brake $B_2$ begins, whereby the pressure $p_2$ corresponds initially to the pressure ($A_1$) (FIG. 1), whereas the pressure $p_1$ corresponds to the full working pressure (A) (FIGS. 1 to 3).

At the moment $t_2$ the pressure space of the new speed at the brake $B_2$ is completely filled so that the brake seizes or engages and the pressure at the brake nearly instantaneously rises to a value substantially approximating the working pressure (A). Simultaneously the first speed is disengaged by disengagement of the brake $B_1$ from the working pressure so that the pressure $p_1$ in the pressure space of brake $B_1$ decreases to zero. The shifting operation now finds itself between the instants $t_2$ and $t_3$ in the regulating phase, approximately between the shifting conditions of FIGS. 2 and 3, until the receiver piston AK at the instant $t_3$ has again reached its initial end position and the pressure $p_2$ in the pressure space of the brake $B_2$ corresponds to the full working pressure (A).

As can be seen from FIG. 5a, during a disengagement of the by-pass clutch Ku at the instant $t_1$ (corresponding to the heretofore customary shifting manner) a sudden torque decrease occurs according to the curve $Md_x$ which extends approximately over the period of time of the filling of the pressure space for the new speed. The torque during the disengagement of the pre-existing speed may even drop to a negative torque value, only to rise again subsequently to the maximum torque when the drive is taken over by the shifting servo element of the new speed.

In contradistinction thereto, it is achieved by the shifting operation according to the present invention by reason of the fact that the by-pass clutch Ku still remains engaged during the filling of the shifting element of the new speed, that practically nearly every interruption in the torque curve is avoided, and that instead, corresponding to the torque curve $Md_e$, the full torque remains preserved up to the point $t_2$ of the change in speed, properly speaking, and only a practically unavoidably brief decrease of the torque takes place during this change in speed. The by-pass clutch Ku is disengaged during the time interval between $t_2$ and $t_3$ with slight application or engagement and is again engaged fully at the instant $t_3$.

Though we have shown and described the present invention only by reference to one embodiment for an automatic shifting system, it is understood that the present invention is not limited thereto but is susceptible of numerous changes and modifications. For example, the present invention may have as many speeds as desirable. Also the shifting may take place by force-locking shifting elements of any known type. The shifting and control pressures can be matched by corresponding dimensioning of the throttle places, of the receiver or the like, to the particular requirements of a given design.

The slippage condition of the torque converter may also be changed in a conventional manner by engagement into the flow circulation, for example, by a guide wheel with adjustable blades, schematically indicated in dash lines in FIG. 1. The arrangement in its simplest form, may thereby be made in such a manner that the guide wheel L includes a spring loaded arm adapted to be displaced by the pressure in line 74 against the spring force. As a result thereof, when there is no pressure in line 74, the spring loaded arm will displace the guide wheel L in such a manner as to increase the differential rotational speed between the pump wheel and turbine wheel while the pressure in line 74 will act on this arm so as to decrease the differential rotational speed between the pump wheel P and the turbine wheel T during normal operation of the torque converter W.

The actuation may then be connected with the shifting system of the change-speed gear in such a manner that with the disengagement of the shifting member of the pre-existing speed, the guide blades are so adjusted in any conventional manner that an operating condition with large slippage is established.

The adjustment of the guide wheel during the shifting operation of a change in the transmission ratio may take place controlled and matched to the shifting operation in such a manner that a temporary unloading of the engine is avoided and the rotational speed of the engine is changed uniformly during the shifting progress in the change-speed gear. This corresponds during an up-shifting from first to second speed corresponding to FIG. 4, to a rotational speed change from point $Q_1$ to point $Q_w$.

Thus, it is obvious that the present invention is susceptible of numerous changes and modifications as known to those skilled in the art and we therefore do not wish to be limited to the details shown and described herein but intend to cover all such changes and modifications as are encompassed by the scope of the appended claims.

We claim:

1. A method for automatically hydraulically shifting a change-speed gear which includes a shifting system having several force-locking shifting means provided with pressure spaces and a source of pressure medium for shifting the transmission speeds thereof, with the use of a variable slippage hydrodynamic unit connected with said change-speed gear and having control means to control the slippage condition thereof, the slippage condition of said hydrodynamic unit being increased during a change in speed, comprising the steps of filling a pressure space provided in one shifting means of a new speed to be engaged with pressure medium while the shifting means for the pre-existing speed remains under hydraulic pressure and a relatively low slippage condition in the hydrodynamic unit is maintained by said control means substantially for such period of time, and substantially simultaneously with the disengagement of the pre-existing speed increasing the slippage condition in the hydrodynamic unit by said control means only after the substantial filling of the pressure space of said one shifting means of the speed to be engaged.

2. A method according to claim 1, with a by-pass clutch for the hydrodynamic unit forming part of said control means, said by-pass clutch including also a shifting means provided with a pressure space, comprising the steps of filling the pressure space of said one shifting means for the speed to be engaged with pressure medium while the shifting means for the pre-existing speed remains under hydraulic shifting pressure and simultaneously the by-pass clutch remains engaged, and disengaging the by-pass clutch only after the filling of the pressure space of said one shifting means for the speed to be engaged and with disengagement of the pre-existing speed.

3. A method according to claim 2, which includes a pressure system for the shifting system, said source of pressure medium forming part of said pressure system, a direct feed from said source of pressure medium to the pressure space of said by-pass clutch to apply to the latter the working pressure of said source and an indirect feed from said source of pressure medium to the pressure space of said by-pass clutch by way of said shifting system to provide an eventually reduced working pressure, comprising the step of replacing the direct feed with working pressure of the shifting means of the by-pass clutch by the indirect feed by way of that part of the pressure system, which also supplies the pressure medium to the shifting means of the pre-existing speed when the shifting system begins to influence the shifting means of the speed to be engaged, and disconnecting said part of the pressure system from the supply with working pressure when the speed to be engaged is fully engaged.

4. A method according to claim 3, in which the shifting system includes throttling means, comprising the step of shifting the by-pass clutch from the direct to the indirect feed by a pressure difference produced in the shifting system of the transmission by the throttling means thereof.

5. A method according to claim 4, in which the shifting system includes a receiver with a receiver piston operable to supply pressure medium and provide a regulating phase for the pressure medium supply, comprising the steps of controlling the shifting pressure by said receiver after the complete supply of the shifting means for the speed to be engaged, and at least partially disengaging the by-pass clutch during the regulating phase by the receiver.

6. A method according to claim 5, characterized in that during the period of disengagement of the by-pass clutch, the by-pass clutch is retained under a residual pressure which lies somewhat above the pressure prevailing on the inside of the hydrodynamic unit.

7. A method according to claim 2, in which the shifting system includes a receiver with a receiver piston operable to supply pressure medium and provide a regulating phase for the pressure medium supply, comprising the steps of controlling the shifting pressure by said receiver after the complete supply of the shifting means for the speed to be engaged and at least partially disengaging the by-pass clutch during the regulating phase by the receiver.

8. A method according to claim 7, characterized in that during the period of disengagement of the by-pass clutch, the by-pass clutch is retained under a residual pressure which lies somewhat above the pressure prevailing on the inside of the hydrodynamic unit.

9. An installation for automatically and hydraulically shifting the transmission ratios of a change-speed gear which includes force-locking shifting means provided with pressure spaces for engaging the individual speeds of the change-speed gear, a hydrodynamic unit connected with said change-speed gear, and engageable means operatively connected with said hydrodynamic unit for controlling the slippage condition of said hydrodynamic unit which is increased by the engageable means during a change in speed, characterized by control means operatively connected with the shifting means and including a pressure system operable to provide a pressure medium, said control means also including first means operable to fill with pressure medium the pressure space provided in the shifting means for the speed to be engaged while the pressure space of the shifting means for the pre-existing speed remains under shifting pressure and second means operatively connected with said first-mentioned engageable means to maintain a relatively small slippage condition in the hydrodynamic unit during such filling operation, said second means being additionally operable to increase by said first-mentioned engageable means the slippage condition of the hydrodynamic unit only after the substantial filling of the pressure space of the shifting means for the speed to be engaged with substantial simultaneous disengagement of the pre-existing speed by said first means.

10. An installation according to claim 9, characterized in that said hydrodynamic unit is a torque converter.

11. An installation according to claim 9, characterized in that said hydrodynamic unit is a hydrodynamic coupling.

12. An installation according to claim 9, characterized in that the shifting pressure is a hydraulic shifting pressure.

13. An installation according to claim 9, with a by-pass clutch means for the hydrodynamic unit forming part of said engageable means and operatively connected with the control means, characterized in that the control means is operable by way of said first means to fill the pressure space of the shifting means for the speed to be engaged with pressure medium while the shifting means for the pre-existing speed remains under shifting pressure and at the same time by by-pass clutch means remains engaged by said second means, and in that the by-pass clutch means is disengaged by said second means only after substantially filling the pressure space of the shifting means for the speed to be engaged with disengagement of the pre-existing speed.

14. An installation with a shifting means for the by-pass clutch means according to claim 13, wherein said pressure system includes a source of pressure medium, and wherein the control means includes direct feed means for supplying the pressure medium to the shifting means of the by-pass clutch means directly from said source of the pressure system and indirect feed means for supplying the shifting means of the by-pass clutch means with pressure medium by way of a part of the pressure system of the installation controlled by said control means, said control means being operable to replace the direct feed means by said indirect feed means when the control means commences to influence the shifting means of the speed to be engaged, said indirect feed means also being operable to supply pressure medium from said source to the shifting means of the pre-existing speed, and said control means being further operable to disengage said part of the pressure system from the source of pressure medium upon substantially full engagemnt of the speed to be engaged.

15. An installation according to claim 14, characterized in that said control means includes a valve means for shifting the by-pass clutch means from the direct to the indirect feed means by a pressure differential in the shifting system of the transmission which is established by said control means.

16. An apparatus according to claim 15, characterized in that the control means includes a receiver means providing a control phase for the pressure medium and having a receiver piston, and receiver-control means controlling the movement of said receiver piston in such a manner that upon substantial completion of the feed of the shifting means for the speed to be engaged, the shifting pressure is controlled by the receiver means and that the by-pass clutch means is at least partially disengaged during the control phase by the receiver means and is re-connected with the direct feed means with a timed delay controlled by said receiver control means.

17. An installation according to claim 16, characterized in that the control means includes a closure valve means operable during the period of disengagement of the by-pass clutch means to close off the pressure space of the by-pass clutch means to thereby prevent an escape of pressure medium from said last-mentioned pressure space and thereby retain said by-pass clutch means under a residual pressure which lies somewhat above the hydraulic pressure prevailing on the inside of the torque converter.

18. An apparatus according to claim 14, characterized in that the control means includes a receiver means providing a control phase for the pressure medium and having a receiver-piston, and receiver control means controlling the movement of the receiver piston in such a manner that upon substantial completion of the feed of the shifting means for the speed to be engaged, the shifting pressure is controlled by the receiver means and that the by-pass clutch means is at least partially disengaged during the control phase by the receiver means and is re-connected with the pressure system with predetermined delay as determined by displacement of the receiver-piston.

19. An installation according to claim 14, characterized in that the control means includes a closure valve means operable during the period of disengagement of the by-pass clutch means to close off the pressure space of the by-pass clutch means to thereby prevent escape of pressure medium from said last-mentioned pressure space and thereby retain said by-pass clutch means under a residual pressure which lies somewhat above the hydraulic pressure prevailing on the inside of the torque converter.

20. An installation according to claim 14, wherein said first means includes at least one command slide valve means initiating the shifting from the pre-existing to a speed to be engaged and a shifting slide valve means for the by-pass clutch means, and a line system for said pressure system which includes a feed line for the pressure medium, characterized in that said shifting slide valve means for the by-pass clutch means alternately controls, on the one hand, a direct line connection and, on the other, an indirect line connection by way of a speed-shifting slide valve means between the feed line of the pressure medium and the shifting means of the by-pass clutch means.

21. An installation according to claim 20, characterized in that the indirect line connection includes a throttle means interconnected in said line system, and in that the line system downstream of the throttle means in conjunction with the line system upstream of the throttle means so acts upon the shifting slide valve means for the by-pass clutch means in mutually opposite directions that the shifting slide valve means for the by-pass clutch means is shifted to the indirect line connection when the pressure is reduced during the shifting operation in the line system downstream of the throttle means.

22. An installation according to claim 21, characterized in that the part of the line system establishing the indirect line connection includes a receiver means operable to control the pressure medium during a predetermined phase and provided with receiver piston means and regulating means for said receiver piston means, and in that the regulating means controls during the shifting operation the connection between said feed line and the part of the line system establishing the indirect line connection so that said last-mentioned part of the line system receives the pressure medium from the receiver means during the control by said regulating means.

23. An installation according to claim 22, characterized in that said regulating means temporarily interrupts the connection between said feed line and the part of the line system establishing the indirect line connection during the shifting operation.

24. An installation according to claim 23, characterized in that said receiver and regulating means are arranged in the part of the line system establishing the indirect connection downstream of a throttle means.

25. An installation according to claim 22, wherein said control means includes an excess pressure closure valve means between the speed-shifting slide valve means and the shifting slide valve means for the by-pass clutch means, said excess pressure closure valve means being operatively connected in the indirect line connection and being operable to separate a line section leading to the by-pass clutch means from the remaining part of the indirect line connection and retaining the same under a predetermined residual pressure, when the indirect line connection becomes pressureless.

26. An installation according to claim 25, wherein the shifting means for the by-pass clutch has a front side and a back side, characterized in that the excess pressure closure valve means has a front and back side and is operatively connected on its back side by way of a line with at least one of the two parts consisting of the inside of the hydrodynamic unit and the back side of the shifting means for the by-pass clutch means.

27. An installation according to claim 26, characterized in that the excess pressure closure valve means is acted upon on its backside by a spring in addition to being acted upon by the pressure of the hydrodynamic unit.

28. An installation according to claim 27, characterized in that the indirect connection of the by-pass clutch means includes a shifting-up slide valve means that opens up said indirect connection during a shifting-up operation.

29. An installation according to claim 9, characterized in that with the use of a torque converter as hydrodynamic unit, an adjustable guide wheel means is provided for increasing the differential rotational speed between pump wheel and turbine wheel during a change in speed.

30. An installation according to claim 29, characterized in that the adjustment of the guide wheel means is so controlled that the moment input of the pump wheel in the course of the rotational speed change of the turbine wheel remains at least nearly constant during the transmission shifting operation.

31. An installation according to claim 30, characterized in that said moment input remains substantially constant.

32. An installation according to claim 20, characterized in that the line system establishing the indirect line connection includes a receiver means operable to control the pressure medium during a predetermined phase and provided with receiver piston means and regulating means for said receiver piston means, and in that the regulating means controls during the shifting operation the connection between said feed line and the line system establishing the indirect line connection so that said last-mentioned line system receives the pressure medium from the receiver means during the control by said regulating means.

33. An installation according to claim 32, characterized in that said regulating means temporarily interrupts the connection between said feed line and the part of the line system establishing the indirect line connection during the shifting operation.

34. An installation according to claim 32, characterized in that said receiver and regulating means are arranged in the part of the line system establishing the indirect connection downstream of a throttle means.

35. An installation according to claim 20, wherein said control means includes an excess pressure closure valve means between the spaced-shifting slide valve means and the shifting slide valve means for the by-pass clutch means, said excess pressure closure valve means being operatively connected in the indirect line connection and being operable to separate a line section leading to the by-pass clutch means from the remaining part of the indirect line connection and retaining the same under a predetermined residual pressure, when the indirect line connection becomes pressureless.

36. An installation according to claim 35, wherein the shifting means for the by-pass clutch means has a front side and a back side, characterized in that the excess pressure closure valve means has a front side and a back side and is operatively connected on its back side by way of a line with at least one of the two parts consisting of the inside of the hydrodynamic unit and the back side of the shifting means for the by-pass clutch means.

37. An installation according to claim 36, characterized in that the excess pressure closure valve means is acted upon on its backside by a spring in addition to being acted upon by the pressure of the hydrodynamic unit.

38. An installation according to claim 20, characterized in that the indirect connection of the by-pass clutch means includes a shifting-up slide valve means that opens up said indirect connection during a shifting-up operation.

39. An installation according to claim 25, characterized in that with the use of a torque converter as hydrodynamic unit, an adjustable guide wheel means is provided for increasing the differential rotational speed between pump wheel and turbine wheel during a change in speed.

* * * * *